Patented Jan. 3, 1928.

1,655,068

UNITED STATES PATENT OFFICE.

PAUL McMICHAEL, OF NEW YORK, N. Y., ASSIGNOR TO HYDROCARBON REFINING PROCESS COMPANY INC., OF NEW YORK, N. Y., A CORPORATION OF NEW YORK.

REFINING OF PETROLEUM OILS.

No Drawing.    Application filed October 23, 1923.    Serial No. 670,226.

This invention relates to the refining of petroleum oils and distillates, and more particularly relates to the removal of sulfur and resin-forming bodies from such oils and distillates.

The presence of sulfur, whether free or in the form of inorganic compounds, such as hydrogen sulfide, or organic compounds, such as alkyl sulphates, is undesirable in petroleum oils or distillates. Such oils usually are disagreeable in odor, more or less corrosive to metals, and are not stable under prolonged exposure to direct sunlight; and when burned, yield products that are malodorous and corrosive. Frequently petroleum distillates, particularly those obtained by cracking processes and especially those having an asphaltic base, contain terpenes, diolefines, their isomers, polymers and other homologues or derivatives and other compounds which possess the characteristic of forming resin-like compounds or substances on standing or when the oils or distillates are burned. These resin forming bodies are particularly objectionable where the oil is brought into contact with hot metal surfaces with insufficient oxygen present to insure complete combustion, as often occurs in internal combustion engines, forming deposits within the engine which are highly insoluble in any known solvent and can be removed only by means of some abrasive or by being burned off with oxygen.

During the distillation of sulfur-bearing crude petroleum oils, especially those having an asphaltic base, I have observed that a certain amount of free sulfur distills as such, which afterwards redissolves in succeeding portions of the hot distillate as it runs down into the condenser. The presence of this free sulfur may be explained in two ways; part of it may be due to the decomposition of organic sulphur compounds, or it may have been contained in the crude oil as such, or it may be due to both causes.

The present general practice in refining such oils and distillates consists essentially in first treating the oil with strong sulphuric acid, then with a doctor solution, and finally steam distilling the oil. The oil is first treated with strong sulphuric acid, the acid used varying in concentration from about 83% to more than 100%, fuming sulphuric acid being used in some cases, to remove sulphur compounds by sulphonation and oxidation and to remove unsaturated compounds, particularly the olefines, to the presence of which has been attributed the failure of petroleum products to remain water white after being refined, especially when exposed to direct sunlight for any considerable time. After separation from the acid and acid sludge, the oil is washed with water to remove any excess acid and then treated with a concentrated solution of caustic soda in which litharge is dissolved or suspended, this solution or suspension being the so-called "doctor" of the petroleum refiner. This solution neutralizes any acid that may remain and removes sulphur, hydrogen sulfide and any organic sulfur compounds that will combine with lead in alkaline solution, but this treatment does not eliminate the alkyl sulfates formed by the initial acid treatment. The oil is then distilled with steam as otherwise the refined product is apt to be or tends to become sour, that is, it is unable to withstand successfully the so-called "doctor-test" which is made to determine if any appreciable amount of sulfur or sulfur compounds is present in the final product. Alkyl sulfates are not eliminated by the "doctor" solution and, if left in the final product, tend to oxidize or decompose, discoloring and imparting a disagreeable odor to the product and rendering the products of combustion from the refined oil malodorous and corrosive. Straight distillation, that is distillation without steam, is unsatisfactory because it yields a product that is or tends to become sour due to decomposition of any alkyl sulfates present.

The effect of the treatment with strong acid depends, to a certain extent, upon the character of the distillate, upon the quantity and strength of the acid used and upon the length of the treatment, but, as usually carried out, this treatment results in considerable loss due to sulphonation, oxidation, polymerization, or other similar action. This loss varies with the amount and character of the unsaturated hydrocarbons present and usually includes the olefines, which are removed by the treatment. This loss is particularly high in the treatment of distillates obtained by cracking processes because of the considerable amount of unsaturated compounds that are present due to the cracking that has taken place. This treatment with strong acid removes substantially all of the olefines and the resin forming bodies described above, but if sufficient and sufficiently strong acid is used and the treatment prolonged enough to act upon all of the unsaturated compounds, especially the olefines, appreciable quantities of alkyl sulfates are formed, which are soluble in the oil being treated and are not removed by subsequent treatment with caustic soda and litharge. That treatment with a "doctor" does not remove all sulfur and sulfur compounds is evidenced by the fact that if the oil is dry distilled after such treatment it will not successfully pass the "doctor test" and will be unmarketable. Alkyl sulfates are readily formed by the action of strong sulphuric acid on the olefines. It has also been my experience that treatment with sulphuric acid of any degree of concentration from 70% to 100% or even with oleum will not, alone, wholly remove sulfur, and will not uniformly produce a refined product of satisfactory color, even after subsequent treatment with an alkali.

According to the present invention, petroleum oils and distillates are treated in such a manner as to remove sulfur and resin-forming bodies present and to yield a refined product with a good color and odor, non-corrosive and stable to light, and of which the products of combustion are not corrosive or malodorous. Refined products may be obtained, according to the present invention, from cracked oils and oils of asphaltic base that are comparable in quality to the products obtained from high grade straight paraffin distillates. This invention also enables the production of refined oils containing the greater part of the olefines and unsaturated chain compounds originally present which are not objectionable in the refined product, thus eliminating this source of loss; although all of the unsaturated compounds may be removed, according to this invention, if desired.

I have found that the greater part of the sulfur compounds present in petroleum oils and distillates can be removed by digesting the oil, or by heating it with reflux condensation, with a solution or emulsion of a hydrate of an alkali or alkaline earth, that is, of a fixed alkali. This treatment also appears to assist in subsequent removal of the remaining sulfur compounds by modifying such sulphur compounds so that they can be substantially removed or materially reduced in amount by an acid treatment of much less rigor than that usually practiced hitherto.

I have further found that when a petroleum oil or distillate is digested with a solution or emulsion of a fixed alkali in the presence of a small amount of ammonia or an ammoniacal salt, the ammonia or ammoniacal salt materially facilitates the removal of sulphur and resin forming bodies from the oil, apparently acting in the nature of a catalyst.

While the treatment of petroleum oils or distillates with strong sulfuric acid, as formerly used, tends to remove all of the unsaturated compounds present, I have found that, subsequent to and in conjunction with such an alkaline treatment, more dilute sulfuric acid can be used to effect the removal of any remaining sulfur and resin forming bodies, and that acid of such reduced strength can be used that at the same time the olefines and other unobjectionable open chain unsaturated hydrocarbons are not materially affected. The treatment of the oil with a strong acid, together with the accompanying losses and undesirable reactions such as the formation of alkyl sulfates, may thereby be eliminated.

Sulfur present in the form of certain sulfur compounds, apparently the thiophenes, is not completely eliminated by digestion with a fixed alkali at low temperatures or by such digestion followed by acid treatment. I have found, however, that higher temperatures, such as can be attained by carrying out the digestion under elevated pressure, tend to break down these refractory compounds so that the sulfur present in such compounds is more easily and more completely removed by digestion with a fixed alkali or by such digestion followed by suitable acid treatment. This invention is particularly adapted to refining cracked oils and pressure distillates since cracking operations tend to eliminate or break down such refractory sulfur compounds and since cracked oils are usually substantially free from such compounds, and such oils can be refined, according to this invention, with the production of a refined product substantially free from sulfur. I have also found in many instances that sulfur present as such refractory compounds can be substantially eliminated by a brief treatment with strong sulphuric acid.

According to the present invention, the oil or distillate may be treated in a closed still, or other suitable closed vessel provided with a reflux condenser, or otherwise digested, with a solution or emulsion of a hydrate of an alkali or alkaline earth. I prefer to use hydrate of lime. The oil and admixed aqueous solution or emulsion are heated, to a temperature depending upon the distillate to be treated, for a period of about one to three or four hours or such other time as may be necessary to effect the requisite refining action. The temperature to which the oil is heated and the temperature of the reflux condenser may be maintained at values such that any water evaporated is returned to the still or digester. Any uncondensed vapors and gases may be cooled and condensed in secondary condensers or coolers and collected in suitable receivers.

I prefer to add a small amount of ammonia or of an ammoniacal salt, such as ammonium chloride or sulfate, to the solution or emulsion of fixed alkali employed in this digestion of the oil. The ammonia or ammoniacal salt seems to act as a catalyst in facilitating the removal of sulfur and resin forming bodies, the ammonia combining with sulfur and sulfur compounds and resinous compounds present, forming compounds of ammonia with these objectionable components which in turn are decomposed by the fixed alkali present with the liberation of ammonia, which reacts with further amounts of the impurities in the oil, and with the formation of compounds of the sulfur and resinous bodies with the fixed alkali which are readily removed from the oil. I have found this alkaline digestion, carried out in the presence of ammonia or an ammoniacal salt, to be effective in the removal of oxidized derivatives of the terpenes, diolefines and their homologues and derivatives and similar resin forming bodies.

Subsequent to the digestion of the oil or distillate with an alkali, the treated oil, after separation of the treating solution or emulsion, may be refined in the usual manner. The alkaline digestion, according to this invention, is a particularly valuable refining process in connection with the treatment of heavy oils which do not require an acid treatment or in cases where, due to sulphonation, strong acid treatment is dangerous. In such cases, the oil may be completely refined by digesting it with a solution or emulsion of a fixed alkali, with or without the use of ammonia or an ammoniacal salt, and then separating the treating solution or emulsion from the treated oil, with any washing that may be necessary.

I find that a particularly advantageous procedure is to treat the oil or distillate by any suitable method such as agitation or injection, subsequent to the alkaline digestion, with sulfuric acid of a degree of concentration between about 70% and 80–83%, depending upon the character of the oil. I prefer to use acid of a degree of concentration of from about 75 to 79%, especially if the oil is of an asphaltic base, and particularly if it was obtained by a cracking process. Acid of this strength will not remove the olefines, and similar unsaturated chain hydrocarbons to any substantial extent, but will, following a preliminary alkaline digestion in accordance with this invention, remove sulfur and sulfur compounds and resin-forming bodies that may remain. The preliminary alkaline digestion apparently modifies the sulfur compounds and resin forming bodies remaining in the oil so that they are readily removed by this less rigorous acid treatment.

Following the alkaline digestion and treatment with sulfuric acid of a strength between 70 and 83%, the distillate or oil may be treated similarly to a straight paraffin distillate and finished in the usual way. The treated oil may be washed with an alkaline solution to neutralize any acid present or it may be distilled in the presence of a fixed alkali, the distillation preferably being completed with steam. Oils refined in this way will contain substantially all of the olefines present in the original oil.

If it is desirable to remove all of the unsaturated compounds, the treatment may be completed by subjecting the oil to the action of sulfuric acid of a concentration between about 83 and 100% or even with stronger acid. A brief treatment with a limited amount of strong sulphuric acid may also be employed for the removal of refractory sulphur compounds, and the amount and concentration of acid and time of treatment may be so regulated as to avoid the removal of large amounts of olefines. Following separation of the oil from the acid and acid sludge, it may be finished by washing with an alkaline solution to neutralize any acid present or it may be steam distilled over a fixed alkali.

I will further illustrate my invention by the following specific examples, but it will be understood that my invention is illustrated thereby and not limited thereto:

100 parts by volume of several crude cracked gasoline distillates having an original sulfur content of from .1% to .8% by weight were digested in a still provided with a reflux condenser with about 1% by weight of hydrate of lime and about .1% of ammonium chloride in solution in about 10 to 33 parts of water for a period of from 1 to 4 hours at about 100° C. The treated oil was then separated from the treating solution and agitated with about 7 parts of a 75–79% solution of $H_2SO_4$ for about ½ to 2 hours, the oil separated and steam distilled. High grade water white oils containing a very low percentage of sulfur, between .012 and .020% by weight of sulfur, were obtained.

A Panuca oil that contained 3.48% by weight of sulphur was distilled without any material cracking and the fraction up to approximately 220° C. collected. This distillate contained 1.52% of sulphur. 100 parts by volume of this fraction were refluxed with about 1% by weight of lime in about 10 parts of water for 2 hours and the oil then separated contained .52% of sulphur. The oil was then agitated with a total of about 10 parts of a 78% solution of $H_2SO_4$ in successive portions having a volume ratio of about 1:3:6 for a period of about 15 minutes each. The oil was then separated and distilled with steam and then had a sulphur content of .123% sulphur. This sulphur content was reduced to .0123% by agitation for 15 minutes with 2 parts of 95½% $H_2SO_4$, followed by a dilute alkaline wash.

100 parts by volume of a straight run distillate from Mexican crude petroleum was refined by refluxing in the presence of lime and ammonium sulphate, separating the oil and agitating it successively with about 10 parts of 78% $H_2SO_4$ for about 1 hour and with about 5 parts of 95½% $H_2SO_4$ for about 15 minutes, and washing with water followed by neutralization with a dilute caustic soda solution. Before refluxing the oil contained 1.56% sulphur by weight, after refluxing contained .51% sulphur, after agitation with 78% acid contained .13% sulphur and after treatment with 95½% acid contained .01% sulphur. The oil was water white although not steam distilled.

This invention enables the production of refined petroleum oils and distillates, particularly from cracked oils or pressure distillates, which are water white, which will not discolor appreciably, even after prolonged exposure to direct sunlight, which have an agreeable odor, which are substantially free from sulfur and components that form resinous bodies, and which do not form malodorous or corrosive products of combustion.

I have found in many cases that it is undesirable to remove all of the unsaturated compounds from petroleum distillates, and that satisfactory refined products suitable for many purposes can be obtained with less loss by this invention which permits the retention of the unsaturated chain hydrocarbons, especially the olefines, in the refined product. These unsaturated hydrocarbons constitute a considerable fraction of the total oil, especially in the case of cracked distillates, and their removal substantially reduces the volume of the product and is a very material and in many instances an unnecessary loss. These unsaturated chain hydrocarbons, have a proportionately lesser hydrogen content, and have a greater thermodynamic energy than saturated compounds. It has been my experience that unsaturated hydrocarbons of this class do not cause discoloration of the product.

However, all of the unsaturated compounds may be removed from the refined oil or distillate, if this is necessary or desirable, without sacrificing any of the other advantages of the invention.

It will thus be seen that the present invention provides for the refining of petroleum oils and distillates by digestion of the oil or distillate with a solution or emulsion of a hydrate of an alkali or alkali earth, preferably in the presence of ammonia or an ammoniacal salt; a method which is especially applicable to oils of an asphaltic base and cracked oils, and particularly adapted to the removal of sulfur and sulfur compounds and resin forming bodies from the oils or distillates. It will also be seen that this invention further provides for an acid treatment, subsequent to this alkaline digestion, of much reduced rigor, which, however, in conjunction with this alkaline digestion, is efficacious in removing substantially all of any remaining sulfur or resin forming bodies, and which may be so regulated that substantially all of the olefines and similar compounds are retained in the refined product, without the objections incident to the use of stronger sulfuric acid. It will also be seen, however, that this invention provides an improved method of refining petroleum oils and distillates which may, with advantage, be used in conjunction with treatment with strong sulfuric acid.

I claim:

1. An improved method of refining petroleum oils and distillates, which comprises digesting the oil at an elevated temperature with an aqueous solution containing a hydrate of a fixed alkali, subsequently treating the oil with sulfuric acid of a concentration between about 70 and 83% sulfuric acid and then treating the oil with sulfuric acid of a concentration greater than about 83% sulfuric acid.

2. An improved method of refining petroleum oils and distillates, which comprises digesting the oil at an elevated temperature with an aqueous solution containing a hydrate of a fixed alkali and an ammonia containing material, subsequently treating the oil with sulfuric acid of a concentration between about 70 and 83% sulfuric acid and then treating the oil with sulfuric acid of a concentration greater than about 83% sulfuric acid.

3. An improved method of refining petroleum oils and distillates, which comprises digesting the oil at an elevated temperature with an aqueous solution containing a hydrate of a fixed alkali, subsequently treating the oil with sulfuric acid of a concentration between about 70 and 83% sulfuric acid and then treating the oil with sulfuric acid of a concentration greater than about 83% sulfuric acid and separating the acid and acid sludge and neutralizing any acid remaining in the oil.

4. An improved method of refining petroleum oils and distillates, which comprises digesting the oil at an elevated temperature with an aqueous solution containing a hydrate of a fixed alkali and ammonia containing material, treating the digested oil with sulfuric acid of a concentration between about 70 and 83% sulfuric acid, and then subjecting the oil to treatment with strong sulfuric acid.

5. An improved method of refining petroleum oils and distillates, which comprises digesting the oil at an elevated temperature with an aqueous solution containing a hydrate of a fixed alkali, treating the digested oil with sulfuric acid of a concentration between about 70 and 83% sulfuric acid, and then subjecting the oil to treatment with strong sulfuric acid.

6. An improved method of refining petroleum oils and distillates, which comprises digesting the oil with about 10 to 33 parts of an aqueous solution containing about 1 part of calcium hydrate and about one tenth part of ammonium chloride per 100 parts of oil for a period of about 1 to 4 hours at a temperature of about 100° C.

7. An improved method of refining petroleum oils and distillates, which comprises digesting the oil with about 10 to 33 parts of an aqueous solution containing about 1 part of calcium hydrate and about one-tenth part of ammonium chloride per 100 parts of oil for a period of about 1 to 4 hours at a temperature of about 100° C., and then treating the oil with about 7 parts of sulfuric acid of a concentration between about 75 and 79% sulfuric acid for a period of from ½ to 2 hours.

In testimony whereof I affix my signature.

PAUL McMICHAEL.